United States Patent [19]

Matsuo

[11] Patent Number: 5,255,149
[45] Date of Patent: Oct. 19, 1993

[54] TEMPERATURE ABNORMALITY DETECTOR FOR ELECTRONIC APPARATUS

[75] Inventor: Yoichi Matsuo, Yamanashi, Japan
[73] Assignee: NEC Corporation, Tokyo, Japan
[21] Appl. No.: 836,907
[22] Filed: Feb. 19, 1992
[30] Foreign Application Priority Data
    Feb. 26, 1991 [JP] Japan .................................. 3-53207
[51] Int. Cl.⁵ .............................................. H02H 5/04
[52] U.S. Cl. .................................... 361/103; 307/117; 374/166
[58] Field of Search .................. 361/103, 106, 25, 27; 307/117; 374/110, 166

[56] References Cited

U.S. PATENT DOCUMENTS

| | | | |
|---|---|---|---|
| 4,122,720 | 10/1978 | Podl | 73/346 |
| 4,198,562 | 4/1980 | Mills et al. | 219/505 |
| 4,797,670 | 1/1989 | Joyner | 340/825.17 |
| 4,940,967 | 7/1990 | Smith | 307/117 |
| 4,975,766 | 12/1990 | Umezawa | 357/81 |
| 5,066,140 | 11/1991 | Beran | 307/117 |

FOREIGN PATENT DOCUMENTS 0446061 9/1991 France .

OTHER PUBLICATIONS

French Search Report, 9202159, Dec. 18, 1992.

Primary Examiner—Todd E. DeBoer
Attorney, Agent, or Firm—Foley & Lardner

[57] ABSTRACT

According to this invention, in a temperature abnormality detector, an electronic apparatus can be continuously operated without halt, a failure of a sensor can be reliably detected, and power supply is interrupted to protect the electronic apparatus when the temperature of the electronic apparatus really reaches a high temperature. In addition, a highly reliable electronic apparatus which is not halted by erroneous detection can be provided, and repairing of the apparatus can be completed within a short time. Even when the apparatus fails, it can be easily restored.

The detector includes a plurality of temperature sensors arranged on an electronic part, a switching circuit for receiving output signals from the temperature sensors, a converting circuit for converting the output signals from the temperature sensors into temperature values, a microprocessor, output circuits of the microprocessor, and a ROM for storing a program for operating the microprocessor.

10 Claims, 5 Drawing Sheets

TEMPERATURE ABNORMALITY DETECTOR FOR ELECTRONIC APPARATUS

BACKGROUND OF THE INVENTION

The present invention relates to detection of a cooling abnormality in an electronic apparatus constituted by a heat-generating electronic part and having a means for cooling the part and, more particularly, to a temperature abnormality detecting system for detecting the temperature abnormality of a heat-generating element.

Today, due to the remarkable improvement of the performance of an electronic apparatus such as a computer, a heat generation density in an electronic apparatus is increasing. For this reason, various cooling methods such as a forced air cooling method and a liquid cooling method have been employed.

In an apparatus having such a cooling mechanism, the internal temperature is monitored by arranging a temperature sensor to protect the apparatus when an abnormality occurs in a cooling system.

A conventional temperature abnormality detecting system will be described below with reference to FIG. 4.

FIG. 4 shows a liquid cooling method. A heat-generating element 23 obtained by assembling integrated circuits and mounted in an electronic apparatus 21 is cooled by supplying a coolant such as water cooled by a cooling apparatus 22.

A current is supplied to the heat-generating element 23 by a power supply unit 25 through a line 211, the connection/disconnection of the power supply unit 25 is controlled by a control unit 26 through a line 212. In this case, a temperature sensor 24 is arranged on the heat-generating element 23, and the temperature is measured in the control unit 26 through a line 213. If the temperature reaches a predetermined temperature or more due to any abnormality in a cooling system, the control unit 26 detects this abnormality to disconnect the power supply unit 25 through the line 212, thereby protecting the heat-generating element 23.

FIG. 5 is a block diagram showing an arrangement of the control unit 26 shown in FIG. 4. FIG. 5 shows a section for controlling temperature measurement and a protecting process, and this section is constituted by a microprocessor 28 serving as its major component.

An output from an analog/digital (A/D) converter 27 receiving a signal at output signal level of the temperature sensor 24 through the line 213 is input to the microprocessor 28. When a temperature is detected as a predetermined temperature or more, an abnormality informing signal is output from an output unit A 30-1 to a host apparatus (not shown), and a power supply control signal is output from an output unit B 30-2 to the power supply unit 25 through the line 212. The microprocessor 28 is operated by a program written in a ROM 29 and controls temperature measurement, discrimination of a measurement value, and output of signals.

FIG. 6 is a flow chart showing an operation of the microprocessor 28 shown in FIG. 5. Predetermined processes are performed in steps S201 to S204, respectively.

The microprocessor 28 determines whether a temperature output from the A/D converter 27 is a predetermined temperature or more (step S202). If NO in step S202, measurement is repeated (step S201). When any failure of the cooling system occurs, and the temperature exceeds the predetermined temperature (step S202), a power-OFF signal is supplied to the power supply unit 25 (step S203) to disconnect the output of the power supply unit 25 and to inform a host apparatus of abnormality occurrence (step S204).

In this conventional temperature abnormality detecting system, when data representing a high temperature is detected due to a failure of a temperature sensor even though the temperature of a heat-generating element is normal, the control unit disadvantageously performs a power-OFF operation. In an apparatus such as a computer requiring a high reliability, the halt caused by such an erroneous detection poses a problem. In addition, in restoring after the halt, a long time is required for determining whether the temperature of the heat-generating element is actually high or the data representing a high temperature is detected due to the erroneous operation of a temperature sensor. Therefore, a long time is required for repairing the apparatus.

SUMMARY OF THE INVENTION

It is an object of the present invention to provide a temperature abnormality detector for an electronic apparatus, capable of continuously operating the electronic apparatus free from halt of the electronic apparatus caused by erroneous detection performed due to failure of a temperature sensor.

It is another object of the present invention to provide a temperature abnormality detector for an electronic apparatus, suitably used in an electronic apparatus such as a computer requiring a high reliability.

It is still another object of the present invention to provide a temperature abnormality detector for an electronic apparatus, capable of discriminating a sensor failure from a temperature abnormality to repair and restore the apparatus for a short time.

In order to achieve the above objects of the present invention, there is provided a temperature abnormality detector for an electronic apparatus, comprising a plurality of temperature sensors arranged near a heat-generating electronic part mounted on an electronic apparatus, first discriminating means for determining a sensor failure when a temperature value measured by one selected temperature sensor from the plurality of temperature sensors is not set within a predetermined range, second discriminating means for determining whether the measured temperature value reaches a first level set within the predetermined range and a second level set as a value larger than that of the first level, third discriminating means for determining a sensor failure when the measured value reaches the second level without passing through the first level on the basis of an output from the second discriminating means, switching means for switching the selected temperature sensor from the temperature sensors to another temperature sensor of the plurality of temperature sensors in response to sensor-failure outputs from the first and third discriminating means, and halt means for interrupting power supply to the electronic part and halting the electronic apparatus when the measured temperature value reaches the first level and then the second level on the basis of an output from the second discriminating means.

DETAILED DESCRIPTION OF THE PREFERRED EMBODIMENT

Figure 1:
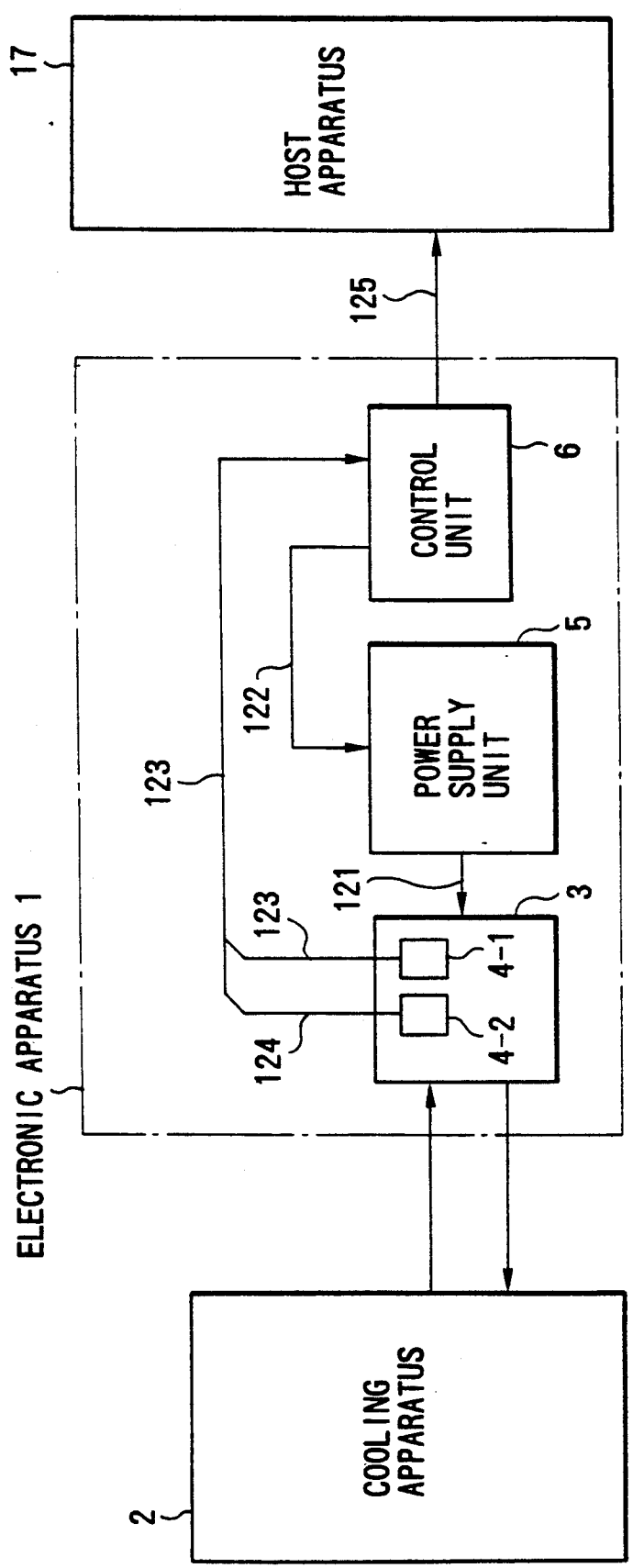
FIG. 1 is a block diagram showing a temperature abnormality detector according to an embodiment of the present invention.

FIG. 1 shows a temperature abnormality detector according to an embodiment of the present invention and particularly shows an arrangement related to temperature detection and temperature processing of an electronic apparatus.

In FIG. 1, reference numeral 1 denotes an electronic apparatus constituted by a heat-generating electronic part and having a means for cooling the electronic part; 2, a cooling apparatus; 3, a heat-generating element; 4-1 and 4-2, temperature sensors; 5, a power supply unit; 6, a control unit; and 17, a host apparatus.

The heat-generating element 3 obtained by assembling integrated circuits or the like is mounted on the electronic apparatus 1, and a current is supplied to the heat-generating element 3 from the power supply unit 5 through line 121. The temperature of the heat-generating element 3 is increased. For this reason, the heat-generating element 3 is cooled by a coolant such as cooling water supplied from the cooling apparatus 2. In this case, the temperature sensors 4-1 and 4-2 are arranged at appropriate positions of the heat-generating element 3 and send output signals to the control unit 6 through lines 123 and 124.

Identical temperature sensors are used as the temperature sensors 4-1 and 4-2. For example, these temperature sensors are semiconductor sensors such as AD590 available from Analog Devices Corp., in which an output voltage is changed in accordance with a change in temperature. The control unit 6 measures a temperature by a signal input from the line 123 and controls an ON/OFF operation of the power supply unit 5 through the line 122. In addition, the control unit 6 outputs various informing signals to the host apparatus 17 through a line 125.

Figure 2:
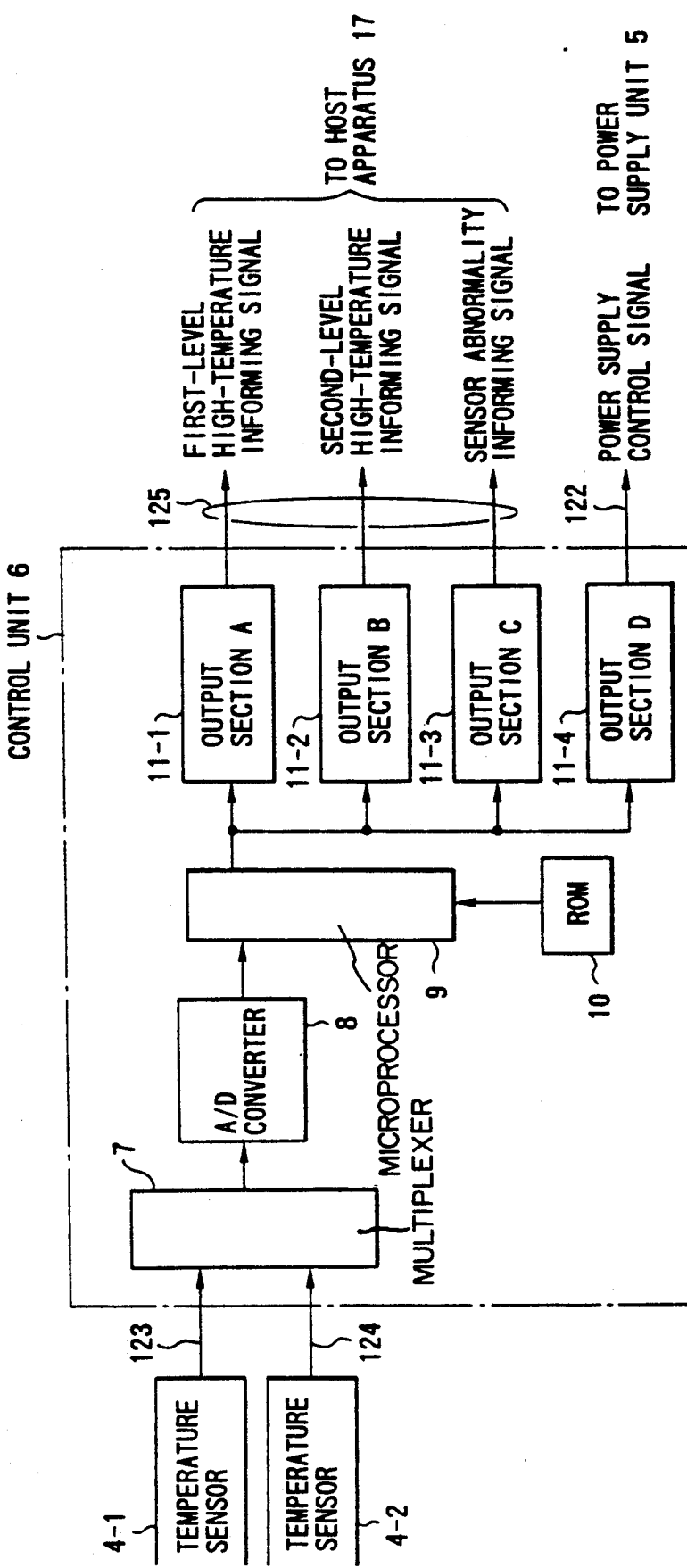
FIG. 2 is a block diagram showing an arrangement of a control unit shown in FIG. 1.

The arrangement of a part of the control unit 6 according to the characteristic feature of the present invention is shown in FIG. 2.

An arrangement of the control unit 6 shown in FIG. 1 is constituted by a temperature data input section, signal output sections, and a microprocessor 9 serving as the major component of the control unit 6, as shown in the block diagram of FIG. 2.

The same reference numerals as in FIG. 1 denote the same parts in FIG. 2. The temperature data input section is constituted by a multiplexer 7 for selecting any one of the lines 123 and 124 respectively connected to the temperature sensors 4-1 and 4-2 and an A/D converter 8 for converting an analog output from the selected temperature sensor to a digital output, and temperature data is input to the microprocessor 9. The temperature data is subjected to predetermined processing and discrimination in accordance with a program written in a ROM 10, and a signal is selectively output to output sections A to D connected to the output terminal of the microprocessor 9. The output from the microprocessor 9 is selectively supplied from the output sections A to D, i.e., output sections A 11-1, B 11-2, C 11-3, and D 11-4, to the host apparatus 17 and the power supply unit 5.

The multiplexer 7 constitutes a switching circuit for receiving outputs from the temperature sensors 4-1 and 4-2 through the lines 123 and 124 and selectively outputting one of the outputs from the temperature sensors 4-1 and 4-2 to a temperature converting circuit (the A/D converter 8) connected to the output terminal of the multiplexer 7. The microprocessor 9 is a microprocessor having an output value from the temperature converting circuit (the A/D converter 8) as an input and operated by the program stored in the ROM 10, and the output sections A 11-1 to D 11-4 constitute an output circuit for outputting an output signal from the microprocessor 9 to an external circuit.

The discrimination and processing of temperature data will be described below with reference to FIG. 3.

Figure 3:
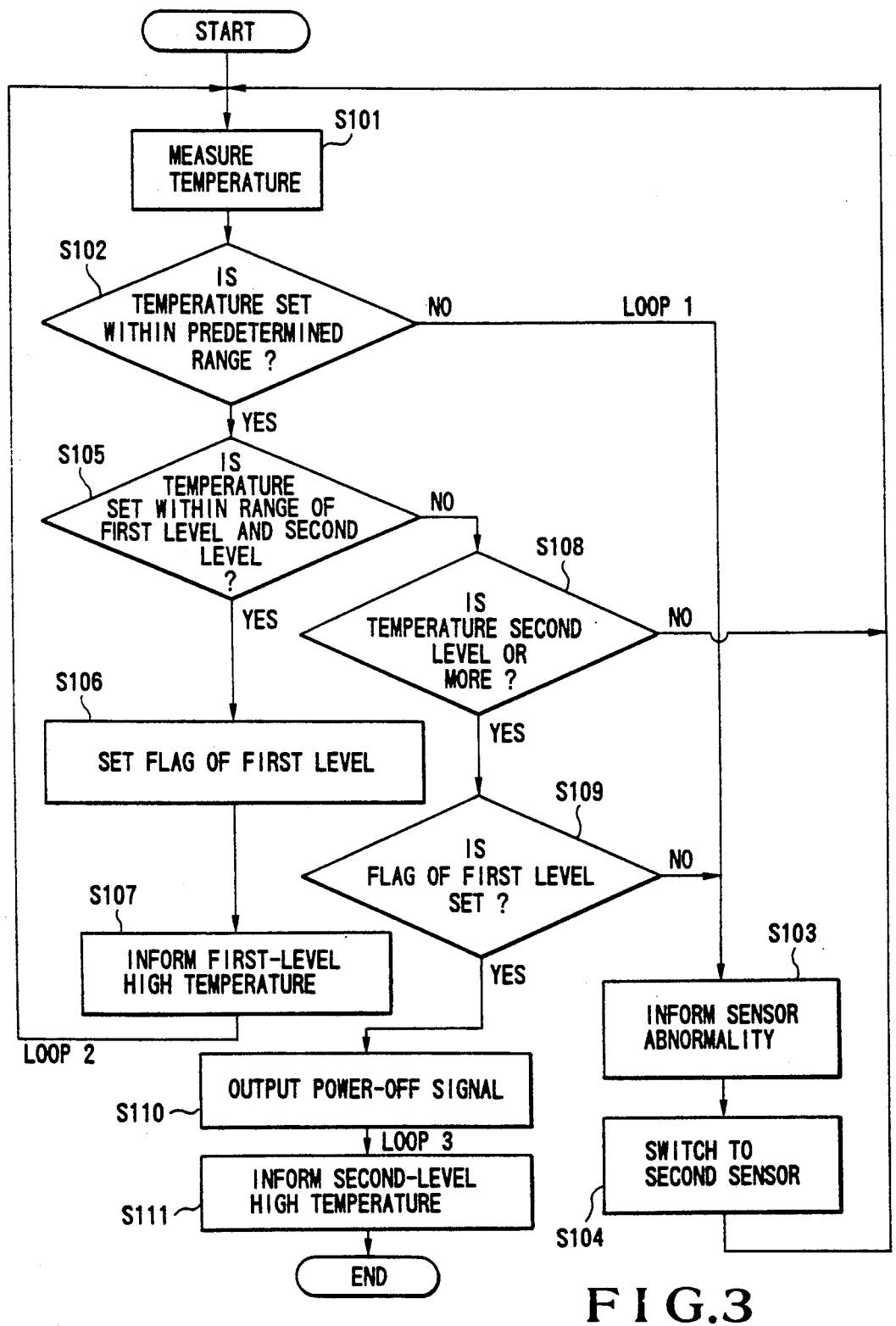
FIG. 3 is a flow chart showing an operation of a microprocessor shown in FIG. 2.
Figure 4:
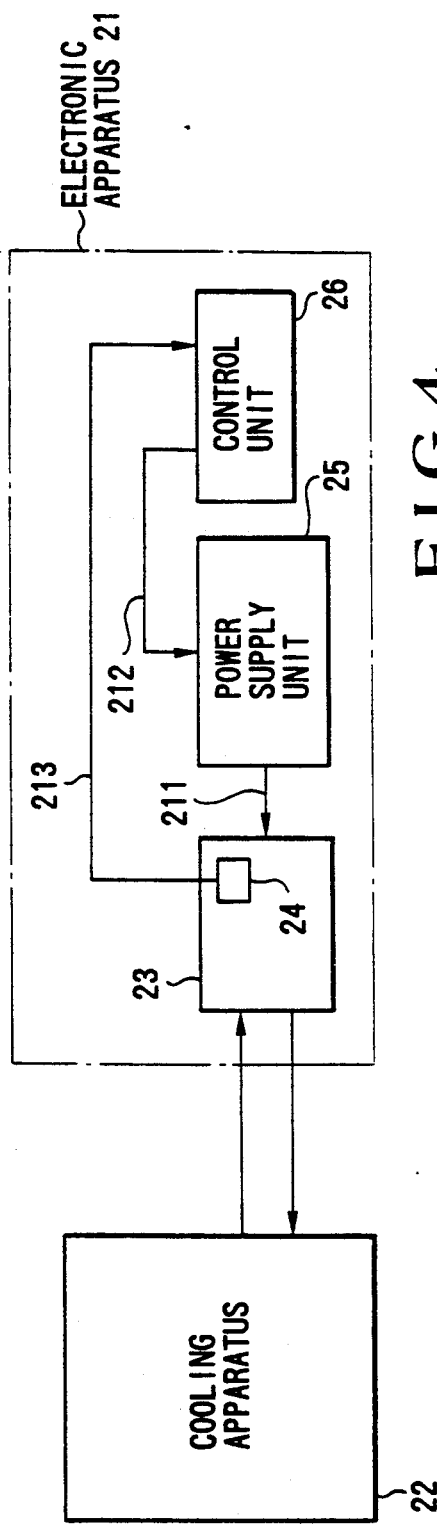
FIG. 4 is a block diagram showing a conventional temperature abnormality detector in which the present invention is not applied.
Figure 5:
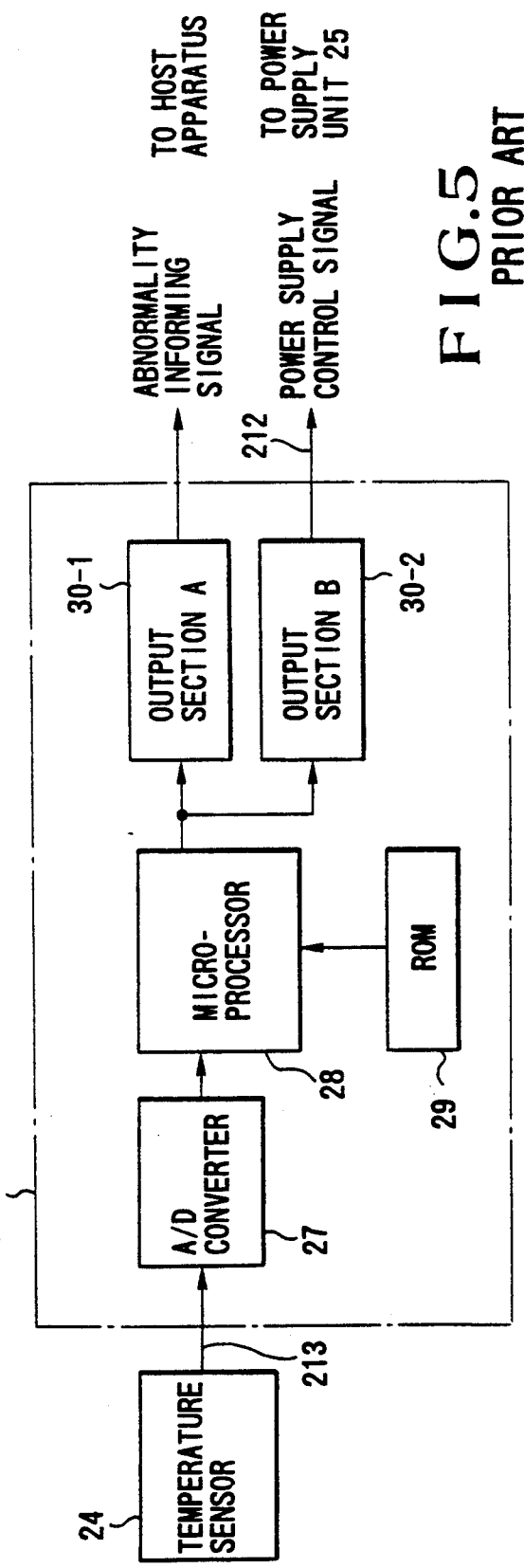
FIG. 5 is a block diagram showing an arrangement of a control unit shown in FIG. 4.
Figure 6:
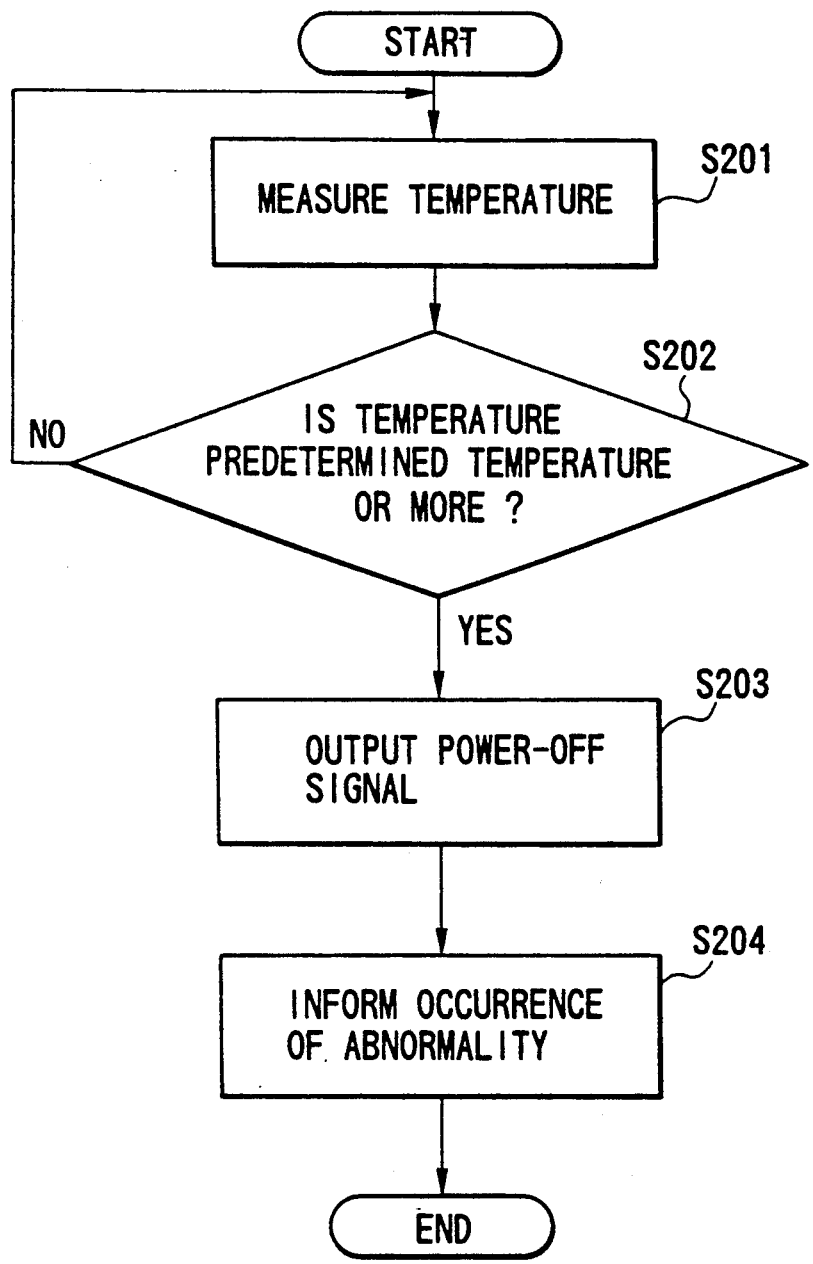
FIG. 6 is a flow chart showing an operation of a microprocessor shown in FIG. 4.

FIG. 3 is a flow chart showing the processing, discrimination, and the like of temperature data, which are operations of the microprocessor 9. Predetermined processing operations are performed in steps S101 to S111.

An output from the temperature sensor 4-1 selected by the multiplexer 7 is input to the microprocessor 9 as digital data through the A/D converter 8 (step S101). This temperature data is processed by a discrimination reference to be described later.

(1) Loop 1

The microprocessor 9 determines whether a temperature is set within a predetermined range (step S102). If data is not set within the predetermined range, it is determined that one temperature sensor fails. At this time, the microprocessor 9 informs the failure of the temperature sensor (step S103) and switches the multiplexer 7 to input an output from the other temperature sensor (step S104). In this manner, the electronic apparatus 1 causes the other temperature sensor to continuously monitor the temperature, such that the electronic apparatus can be continuously operated.

In this case, the above predetermined range is set to include temperatures which can be obtained in normal and abnormal states of the temperature sensors. That is, a temperature falling outside the predetermined range is an extremely high or low temperature which cannot be obtained even when a cooling system fails.

(2) Loop 2

For temperatures set within a predetermined range, high-temperature discrimination values are set at two levels. A small value is represented by the first level (T1), and a value larger than the first level is represented by the second level (T2). The first level (T1) is set as a value corresponding to a temperature at which the temperature of the cooling system is higher than that in a normal state but the cooling system can be operated without any trouble, and the second level (T2) is set as a value corresponding to an upper limit temperature at which integrated circuits and the like are normally operated without any damage.

At this time, in the loop 2, the microprocessor 9 determines whether temperature data T is set within the predetermined range (step S102). If YES in step S102, the microprocessor 9 determines whether the temperature data T is set within the range of the first level (step S105). If this determination result is set within the following temperature range:

$$T1 \leq T < T2$$

a flag of the first level is set in a memory (step S106), the microprocessor 9 informs that a high temperature of the first level is generated to continue the operation (step S107).

(3) Loop 3

After the high temperature of the first level (T1) is generated, when the temperature reaches a high temperature of the second level (T2), the microprocessor 9 determines in the loop 3 (step S108) whether the temperature is higher than the second level (T2). If YES in step S108, a power-OFF signal output is immediately sent to the power supply unit 5 through the output section D 11-4 to interrupt the power supply (step S110), and the microprocessor 9 informs the high temperature of the second level representing the abnormality of the cooling system (step 111). Although the value larger than that of the second level (T2) is detected, when no value of the first level is detected (this is determined by the flag of the first level in step S109), the failure of a sensor is determined, and the failure of the sensor is informed. At the same time, the microprocessor switches the multiplexer 7 to input an output from the temperature sensor 4-2 as data so as to continuously operate the electronic apparatus 1 (steps S103 and S104).

The above operation in the loop 3 is performed because it is considered that the temperature of the heat-generating element 3 necessarily passes through the first level (T1) when the temperature is increased. This operation is a characteristic feature of the present invention. According to the present invention, the failure of a temperature sensor is reliably detected, and an electronic apparatus is not halted.

When a temperature corresponds to a normal value, temperature measurement is repeated in step S101, and the temperature is always monitored in the above loop.

According to the present invention, the microprocessor 9 comprises a first discriminating means for determining a sensor failure when a temperature value falls outside a predetermined range, a second discriminating means for determining whether the measured value reaches the threshold values of first and second levels in the predetermined range such that the second level is set as a value larger than that of the first level, a third discriminating means for determining a sensor failure when the temperature value reaches the second level without passing through the first level, and a halt means for interrupting power supply to the electronic part on the basis of outputs from these discriminating means. If the failure of the sensor is determined, the failure of the sensor is informed to the host apparatus, and a switching circuit (the multiplexer 7) switches the output signal from one temperature sensor to an output signal from the other temperature sensor to measure the temperature, such that an electronic apparatus is continuously operated. Even when a value corresponding to a temperature reaches the first level but does not reach the second level, the microprocessor 9 informs that the value has reached the first level to continuously operate the electronic apparatus. Only when a value corresponding to a temperature reaches the second level after the temperature of the first level is detected in the predetermined range, a temperature abnormality is informed, and power supply to an electronic part is interrupted to halt the electronic apparatus. Therefore, only when the temperature of the electronic part really reaches a value corresponding to a temperature at which the operation of the electronic apparatus cannot be continuously operated, the operation of the electronic apparatus is halted.

As described above, according to the present invention, in a temperature abnormality detecting system, a plurality of temperature sensors are arranged, and the following advantage can be obtained. That is, when one sensor of the temperature sensors fails, the failed sensor is switched to the other sensor to continue the operation of an electronic apparatus without halt of the electronic apparatus. Two checks are performed, i.e., a case wherein a temperature falls outside a range of a temperature at which a temperature sensor may fail and a case wherein two discrimination levels are set and a value corresponding to a temperature reaches the second level without passing through the first level, thereby reliably detecting the failure of the sensor. Only when the temperature really reaches a high temperature, power supply is interrupted to protect the electronic apparatus. Therefore, a highly reliable electronic apparatus which is not halted by erroneous detection can be provided. In addition, since the failure of a sensor and generation of a truly high temperature can be independently informed, repairing of the apparatus can be completed within a short time. Even if the apparatus fails, it can be easily restored.

What is claimed is:

1. A temperature abnormality detector for an electronic apparatus, comprising:

a plurality of temperature sensors arranged near a heat-generating electronic part mounted on an electronic apparatus;

first discriminating means for determining a sensor failure when a temperature value measured by one selected temperature sensor from said plurality of temperature sensors is not set within a predetermined range;

second discriminating means for determining whether the measured temperature value reaches a first level set within the predetermined range and a second level set as a value larger than that of the first level;

third discriminating means for determining a sensor failure when the measured value reaches the second level without passing through the first level on the basis of an output from said second discriminating means;

switching means for switching said selected temperature sensor from said temperature sensors to another temperature sensor of said plurality of temperature sensors in response to sensor-failure outputs from said first and third discriminating means; and halt means for interrupting power supply to said electronic part and halting said electronic apparatus when the measured temperature value reaches the first level and then the second level on the basis of an output from said second discriminating means.

2. A detector according to claim 1, further comprising means for outputting a first-level high-temperature informing signal when the measured temperature value reaches the first level but does not reach the second level.

3. A detector according to claim 1, further comprising means for outputting a second-level high-temperature informing signal when the measured temperature value reaches the first level and then the second level.

4. A detector according to claim 1, further comprising means for outputting a sensor abnormality informing signal in response to the sensor-failure outputs from said first and third discriminating means, so that said electronic apparatus is continuously operated.

5. A detector according to claim 1, wherein said electronic apparatus is continuously operated even after said temperature sensors are selectively switched by said switching means.

6. A detector according to claim 1, wherein said first to third discriminating means and said halt means are constituted by a microprocessor, and said switching means is constituted by a multiplexer, and further comprising an A/D converter for converting an analog output from said multiplexer into a digital signal and outputting the digital signal to said microprocessor.

7. A detector according to claim 1, wherein said plurality of temperature sensors are two semiconductor temperature sensors each having an output voltage changed in accordance with a temperature.

8. A detector according to claim 1, further comprising memory means for storing data representing that the measured temperature value reaches the first level by an output from said second discriminating means, so that said third discriminating means performs discrimination with reference to a content stored in said memory means.

9. A detector according to claim 1, further comprising cooling means for cooling said electronic part, so that said halt means detects a high temperature of said electronic part caused by abnormality of a cooling system to designate to interrupt power supply to said electronic apparatus.

10. A temperature abnormality detector for an electronic apparatus, comprising:
   a temperature sensor arranged near a heat-generating electronic part mounted on an electronic apparatus;
   first discriminating means for determining a sensor failure when a temperature value measured by said temperature sensor does not fall within a predetermined range;
   second discriminating means for determining whether the measured temperature value reaches first level set within the predetermined range and second level set as a value larger than that of the first level;
   third discriminating means for determining a sensor failure when the measured value reaches the second level without passing through the first level on the basis of an output from said second discriminating means; and
   halt means for interrupting power supply to said electronic part and halting said electronic apparatus when the measured temperature value reaches the first level and then the second level on the basis of the output from said second discriminating means.

* * * * *